Inventor:
Frank Bortolus

Patented Oct. 6, 1931

1,826,199

UNITED STATES PATENT OFFICE

FRANK BORTOLUS, OF EVELETH, MINNESOTA

POSITIONING BRACKET FOR SNATCH BLOCKS

Application filed May 19, 1928. Serial No. 279,105.

This invention relates to a new and improved supporting construction for blocks or pulleys, or more specifically to a hook and bracket for positioning such blocks when in use.

In a number of types of mining operations drag line buckets are used operated by means of a line passing through a pulley secured in place at a point distant from the loading point and beyond the material to be handled by the scraper or bucket. The lines pass from the bucket through the pulley to the hoist motor or other source of power. The return line connects the bucket and the source of power so that it may be moved in either direction. The line is therefore under strain upon movement of the bucket in either direction. Where ordinary types of blocks are used and are merely provided with hooks by means of which they may be hooked into rings or loops of cable or chain, the pulleys tend to hang down and the cable wears the edge of the pulley block. This wear is not only detrimental to the block and to the cable but also serves to waste power.

It is an object of the present invention to provide a positioning means for blocks of this character.

It is a further object to provide positioning means adapted to maintain the block in such a position as to cause the cable to normally pass clear of the sides of the block when under strain.

It is also an object to provide a construction which is simple and adapted for commercial production.

Other and further objects will appear as the description proceeds.

Figure 1:
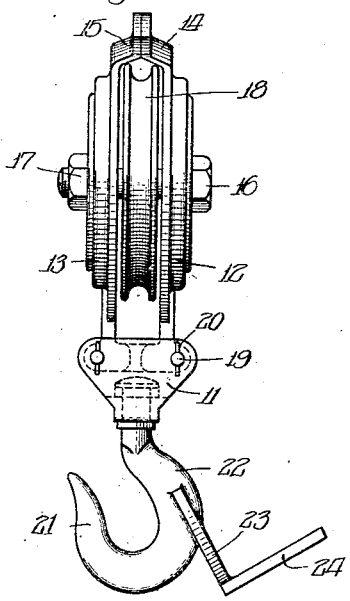
Figure 2:
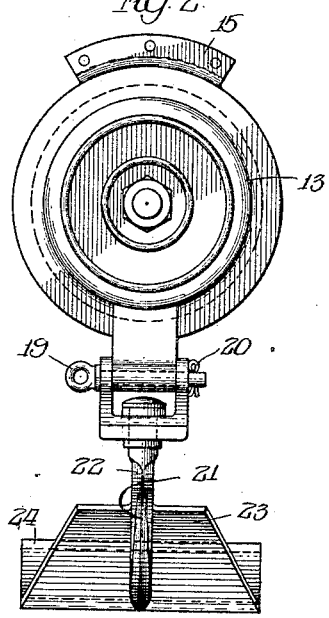

I have illustrated a preferred embodiment of my invention in the accompanying drawings, in which Figure 1 is a side view of a snatch block equipped with my improved positioning structure; and Figure 2 is a view of Figure 1 as seen from the left.

The snatch block comprises the connecting frame 11 to which are pivoted the sides 12 and 13. These sides are provided with the engaging lips 14 and 15. The sides are held together by the bolt 16 and nut 17, this bolt also serving as an axle for the pulley wheel 18. The side members 12 and 13 are pivotally connected to the frame 11 by the pins 19 retained in place by the cotter pins 20. The hook 21 is swiveled in the frame 11.

The closed side 22 of the hook has secured thereto the connecting portion 23 of the positioning bracket. This bracket is further provided with the bearing portion 24 which is located substantially at right angles to the portion 23. It will be noted that the positioning bracket comprising the connecting portion 23 and the bearing portion 24 forms a substantially V-shaped member in which the base of the V is substantially in a plane normal to the axis of the hook and tangent to the bottom of the eye portion of the hook.

In the use of the hook in the form shown, if the hook is hooked into a horizontally extending eye or into a chain or cable passed about a vertical post, the bearing portion 24 will engage the post or other surface below the eye or securing chain or cable. It will prevent the hook from swinging down and permitting the pulley to hang against the wall or post, as it normally would under the weight of the pulley if it were not thus supported. If the hook and pulley were to hang down without this support, there is the tendency for the cable used with the pulley to engage only a portion of the pulley wheel and to wear notches in the side member 13 and also thus wear the cable, and waste power.

With the pulley or block supported slightly below the horizontal, as it will be by the form of bracket shown, the pulley wheels extend substantially in the plane of the cable when in use and the cable engages a greater portion of the pulley wheel 18 and passes out beside the lips 14 and 15 without engaging the side members 12 or 13. This construction, therefore, affords a longer life to the cable and pulley and effects a saving in power.

It will be understood that the bracket may be modified in design and construction to hold the pulley at different angles from different types of supports and may be otherwise modified to meet varying conditions, and I contemplate such changes and modifications as come within the spirit and scope of the appended claim.

I claim:

A supporting hook for a pulley block comprising a swivel member adapted to be connected to the pulley block, a hook connected to the swivel member, a bracket having sides at right angles to each other and one of said sides being substantially tangent to a curved portion of said hook, said bracket being integral with the hook.

Signed at Eveleth, Minnesota, this 12th day of May, 1928.

FRANK BORTOLUS.